Jan. 11, 1944.  J. E. ANDERSON  2,339,042
PACKING
Filed Oct. 5, 1942   2 Sheets-Sheet 1

INVENTOR
John E. Anderson
BY Harris G. Luther
ATTORNEY.

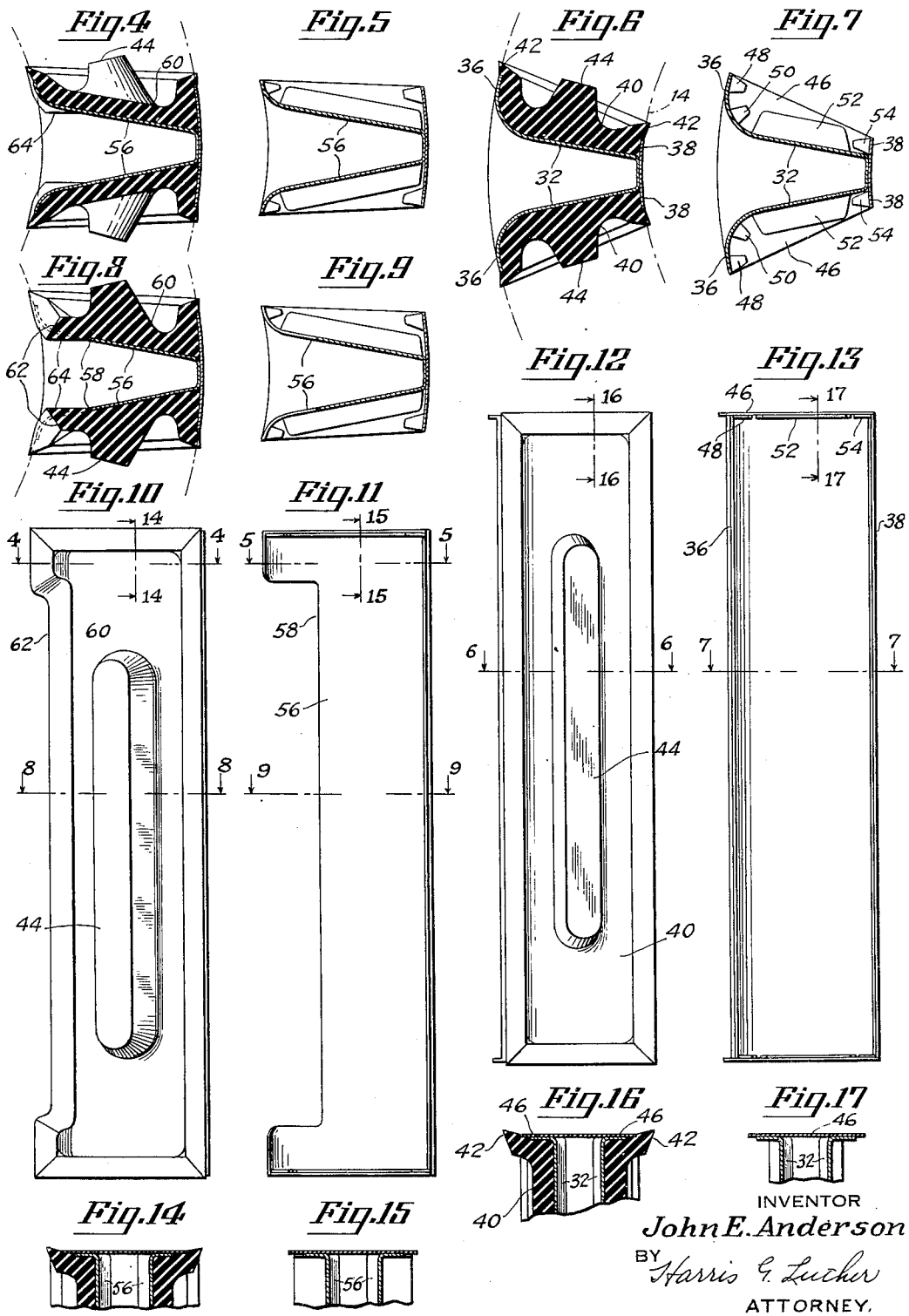

Patented Jan. 11, 1944

2,339,042

UNITED STATES PATENT OFFICE 2,339,042

PACKING

John E. Anderson, Portland, Conn., assignor to United Aircraft Corporation, East Hartford, Conn., a corporation of Delaware Application October 5, 1942, Serial No. 460,823

11 Claims. (Cl. 309—22)

This invention pertains to the packing of hydraulic motors of the kind used in the hubs of variable pitch aircraft propellers. The fluid pressures are high, the service is severe, and reliability of operation is essential.

The motor herein disclosed is of the rotary type having a fixed central cylindrical member with outwardly projecting vanes and a cylindrical member rotatable about the central member and having inwardly projecting vanes. High pressure fluid, usually oil, admitted between the fixed and movable vanes, causes relative rotation of the members.

Serious difficulties have been encountered in preventing leakage of oil past the vanes. Since it is commercially impracticable to manufacture metal-to-metal surfaces of sufficient accuracy for the purpose it has been found necessary to use resilient packing, usually rubber, to prevent leakage.

Many attempts were made to use resilient packing while holding the packing in position by various kinds of retainers which were held in place by rivets. None of these attempts were successful. There was leakage past the rivets, and the rivets prevented the packing from adjusting itself relatively to the vanes.

The above difficulties are overcome by the present invention, which provides a backing plate on each side of the vane, the plates associated with each vane being joined by end plates to form a unitary cap snugly fitting the vane (but otherwise unattached thereto), with the rubber packing molded to the backing plates. The cap may be made as a die casting or may be of sheet metal formed to shape and welded or otherwise secured to form a unitary structure. The caps are not rigidly attached to the vanes and are therefore, to a certain extent, self-adjusting in their operative positions, not only on their respective vanes but also against the working surface with which the caps are in radial contact.

Other objects and advantages will be apparent from the specification and claims, and from the accompanying drawings which illustrate what is now considered to be a preferred embodiment of the invention.

Fig. 1 is a cross section on line 1—1 of Fig. 2.
Fig. 2 is a cross section on line 2—2 of Fig. 1.
Fig. 3 is a cross section on line 3—3 of Fig. 1.
Fig. 4 is a cross section on line 4—4 of Fig. 10.
Fig. 5 is a cross section on line 5—5 of Fig. 11.
Fig. 6 is a cross section on line 6—6 of Fig. 12.
Fig. 7 is a cross section on line 7—7 of Fig. 13.
Fig. 8 is a cross section on line 8—8 of Fig. 10.
Fig. 9 is a cross section on line 9—9 of Fig. 11.
Fig. 10 is a side view of a complete unit adapted for packing a vane of the non-rotatable, central, motor member.
Fig. 11 is a view of the metal cup of the unit shown in Fig. 10.
Fig. 12 is a side view of a complete unit adapted for packing a vane of the rotatable, outer, member.
Fig. 13 is a view of the metal cup of the unit shown in Fig. 12.
Fig. 14 is a cross section on the line 14—14 of Fig. 10.
Fig. 15 is a cross section on the line 15—15 of Fig. 11.
Fig. 16 is a cross section on the line 16—16 of Fig. 12.
Fig. 17 is a cross section on the line 17—17 of Fig. 13.

In the drawings, a central cylindrical member 10 is attached to the propeller hub by flange 12. Surrounding member 10 is a tubular member 14 having outwardly projecting vanes 16. Since member 14 is attached to fixed member 10 by splines 18, vanes 16 constitute the fixed abutments of the motor.

The outer rotatable member 20 is attached to the interior of the propeller blade shank by splines 22 and has inwardly projecting vanes 24 which rotate circumferentially with reference to abutments 16, depending on the flow of oil into or out of arcuate chambers 26 and 28, through conduits 30, 32, under control of the pilot or governor.

The object of the invention is to prevent leakage of fluid past vanes 16 and 24. This is accomplished by providing each vane with a detachable cap adapted to enclose the vane. Each cap supports resilient packing on each of its fore-and-aft sides and the packing projects slightly at all edges.

The operating fluid presses the edges against the surface with which the edges are in contact, thereby aiding in maintaining tightness of the joints.

Preferably, the sides of the caps are cup-shaped, thereby subjecting the edges of the resilient packing to pronounced radial pressure against the surfaces with which the packing is in contact.

Preferably, the caps are of metal, either die cast, as indicated in Figs. 1, 2, and 3, or of sheet metal welded, or otherwise secured, into unitary structures as illustrated in Figs. 4–17 inclusive.

Fig. 12 is an enlarged side view of a cap with packing molded thereto and adapted for use on a movable vane 24. The cap has comparatively flat sides 32, outwardly curved as at 36. The closed side of the cap has a curved plate extended as at 38 to form, with sides 32 and curved extensions 36, cup-shaped sides for the cap, into which are molded resilient packings 40. The edge of the packing extends beyond the rim of the cap as indicated at 42.

The parts of resilient material projecting, as at 44, beyond rim 42, serve as bumpers should vanes approach each other beyond predetermined limits, thereby protecting the sharp edges of the packings, which would otherwise come in contact with each other.

Fig. 16 shows how the ends of the cap are closed by plates extending as at 46 to complete the cup-shaped formation of the cap sides.

Figs. 7, 13 and 17 show the cap of the structure above described but with the rubber removed, thereby exposing the bent tabs, such as 48, 50, 52, 54 which aid in welding the sheet metal into a unitary cap structure.

Figure 1:
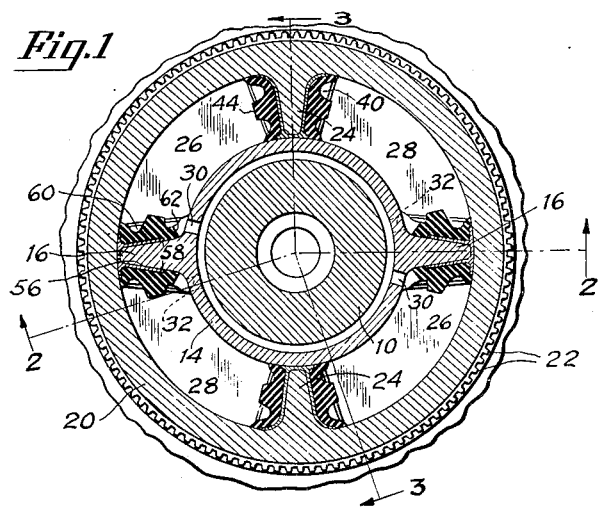
Figure 2:
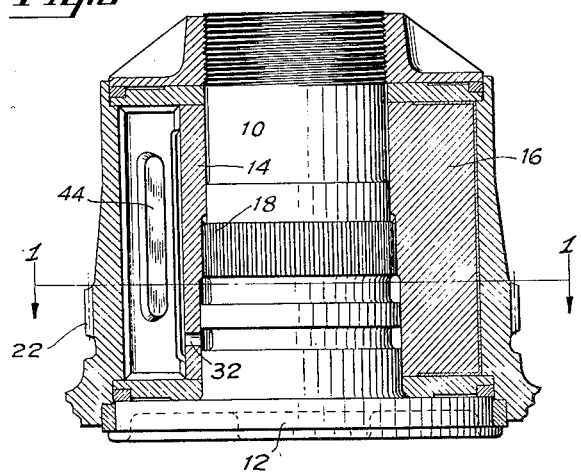
Figure 3:
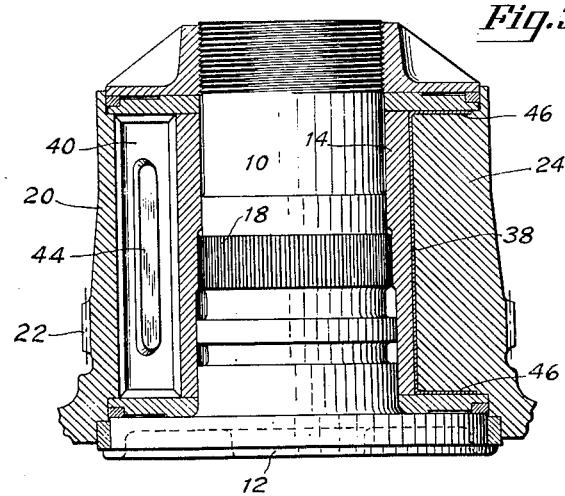

The modification shown in Figs. 4, 5, 8, 9, 10, and 11 is similar to that described above but adapted for use on abutments 16, cap 56 being cut away as at 58, and packing 60 being cut away as at 62 in order not to interfere with the oil flowing through orifices 30 and 32. The metal cap is cut back further than the packing in order to permit the rubber at 64 (Fig. 8) to make adequate resilient sealing contact with the sides of the vane.

It is to be understood that the invention is not limited to the specific embodiment herein illustrated and described, but may be used in other ways without departure from its spirit as defined by the following claims.

I claim:

1. Packing for a rotary vane hydraulic motor comprising a cap adapted to snugly enclose the vane and having a unitary portion thereof engaging opposite sides of the latter, said cap having resilient packing on the sides thereof, said packing projecting slightly beyond the edges of the cap.

2. Packing for a rotary vane motor comprising a metal cap adapted to snugly cover a vane, the fore-and-aft sides of said cap being cup-shaped, each cup being lined with resilient packing, the edges of said packing projecting beyond the rim of said cup.

3. Packing for a vane in a rotary hydraulic motor comprising a cap enclosing the vane but unattached thereto, said cap having resilient packing on the fore-and-aft sides thereof, said packing projecting slightly beyond the edges of said cap.

4. Packing for a vane in a rotary hydraulic motor comprising a cap enclosing the vane but unattached thereto, said cap having resilient packing molded onto the fore-and-aft sides thereof, said packing projecting slightly beyond the edges of said cap.

5. Packing for a vane in a rotary hydraulic motor comprising a cap enclosing the vane, the fore-and-aft sides of said cap being cup-shaped, said sides having resilient packing molded therein and projecting slightly beyond the edges thereof.

6. Packing for a vane in a rotary hydraulic motor comprising a cap snugly enclosing the vane, the fore-and-aft sides of said cap being cup-shaped, said sides having resilient packing mounted therein and projecting slightly beyond the edges thereof.

7. Packing for a vane in a rotary hydraulic motor comprising a cap enclosing the vane, the fore-and-aft sides of the cap being cup-shaped, and said sides being covered by resilient packing so shaped as to cause the hydraulic pressure in the motor to press the edges of said packing radially against the surfaces with which said edges are in contact.

8. In a hydraulic motor having relatively movable concentric members, each member having vanes projecting towards the other member, a packing cap enclosing each vane, each of said members being effective to retain the caps of said other member in operative positions on their respective vanes.

9. Packing for a hydraulic motor having relatively movable concentric members, each member having vanes projecting towards the other member, each vane having a cap enclosing said vane and having resilient packing on the fore-and-aft sides thereof, each packing having circumferentially projecting portions to serve as resilient stops should the vanes approach each other beyond predetermined limits.

10. Packing for the relatively movable members of a rotary vane type hydraulic motor including a cap member for enclosing a vane, said cap member having a generally U-shaped portion straddling the end of the vane and overlying opposite sides thereof and also having end portions overlying opposite ends of the vane and connecting the sides of said U-shaped portion, packing material carried by each side of said cap member bridging the spaces between the relatively rotatable members adjacent the vane and having resilient sealing edges extending around the periphery thereof in position to overlie the surfaces of the adjacent relatively movable members.

11. Packing for the relatively movable members of a rotary vane type hydraulic motor including a cap member for enclosing a vane, said cap member having a generally U-shaped portion straddling the end of the vane and overlying opposite sides thereof and also having end portions overlying opposite ends of the vane and connecting the sides of said U-shaped portion, said cap constituting a backing member for the packing, packing material carried by each side of said U-shaped portion comprising shallow cup-shaped members disposed back-to-back on opposite sides of the vane and bridging the spaces between the relatively rotatable members adjacent the vane, the sides of said cup-shaped members being resilient and terminating in relatively thin peripheral sealing edges which are continuously urged into sealing engagement with the relatively rotatable members, said cap and the packing material carried thereby being positioned by the vane against rotary movement relative thereto but being otherwise free to float on the vane.

JOHN E. ANDERSON.